United States Patent

Hori

[11] Patent Number: 5,816,523
[45] Date of Patent: Oct. 6, 1998

[54] GEAR MECHANISM AND WEBBING RETRACTOR

[75] Inventor: Seiji Hori, Aichi-ken, Japan

[73] Assignee: Kabushiki Kaisha Tokai-Rika-Denki-Seisakusho, Aichi-ken, Japan

[21] Appl. No.: 598,843

[22] Filed: Feb. 9, 1996

[30] Foreign Application Priority Data

Feb. 17, 1995 [JP] Japan .................................... 7-029115

[51] Int. Cl.$^6$ ................................................. B60R 22/38
[52] U.S. Cl. .................................. 242/382.1; 242/382.4; 242/385.1
[58] Field of Search .............................. 242/381.2, 382.4, 242/385.1; 74/435, 436; 200/61.58 B; 280/807

[56] References Cited

U.S. PATENT DOCUMENTS

| | | | |
|---|---|---|---|
| 2,881,630 | 4/1959 | Opocensky | 74/435 |
| 3,806,678 | 4/1974 | Quinting et al. | 200/61.58 B |
| 3,830,444 | 8/1974 | Sargeant | 242/107.4 |
| 3,853,284 | 12/1974 | Hasegawa et al. | 242/107.4 |
| 3,884,088 | 5/1975 | Bertozzi et al. | 74/84 |

FOREIGN PATENT DOCUMENTS 1063315  12/1953  France .
1461675  6/1977  Switzerland .

OTHER PUBLICATIONS

European Search Report.

Primary Examiner—Donald P. Walsh
Attorney, Agent, or Firm—Sixbey Friedman Leedom & Ferguson; Thomas W. Cole

[57] ABSTRACT

A gear mechanism for reducing a rotational speed of a driving gear and transferring the reduced rotational speed to a gear to be driven comprises an arbitrary number of gear teeth attached to the driving gear and smaller than the number of teeth determined by a module and a stopper having a stopper surface which is attached to the driving gear so as to be displaced relative to said gear teeth along the axial direction of the driving gear and which draws a circle identical in size to a circle drawn by a locus of rotation of an addendum of each gear tooth upon rotation of the driving gear and meshes with gear teeth of the driven gear upon disengagement of the gear teeth from the teeth of the driven gear so that the rotation of the driven gear is controlled by the stopper. Thus, when the gear teeth are in disengagement with the teeth of the driven gear, the stopper is maintained in meshing engagement with the gear teeth of the driven gear so as to prevent the driven gear from rotating.

12 Claims, 10 Drawing Sheets

GEAR MECHANISM AND WEBBING RETRACTOR

BACKGROUND OF THE INVENTION

1. Field of the Invention

The present invention relates to a gear mechanism for transmitting a reduced rotational speed to a gear to be driven, which meshes with a driving gear. The present invention also relates to a webbing retractor equipped with a gear mechanism for reducing the number of rotations of a webbing take-up spindle and transmitting the reduced number of rotations.

2. Description of the Related Art

The number of teeth of a driving gear (pinion) is univocally determined by a module. A reduction ratio of a gear mechanism is represented as a numerical value obtained by dividing the number of teeth of the pinion by the number of teeth of a gear to be driven.

A seat belt system attached to a vehicle is constructed as shown in FIG. 11. In the seat belt system, a webbing 51 is manufactured as an elongated integral-type member. One end of the webbing 51 is wound on a webbing take-up spindle of a retractor 53 attached to a lower portion of a vehicle body so as to correspond to a seat 50 by an urging force. The webbing 51 is pulled out of the retractor 53 and passes through a shoulder anchor 55 attached to an upper portion in the vehicle's interior. Thereafter, the other end of the webbing 51 is fastened to an anchor plate provided adjacent to the retractor 53 attached to the lower portion of the vehicle body. Further, the webbing 51 has a tongue plate 52 held so as to be movable along the longitudinal direction of the webbing 51. On the other hand, a buckle 54 is attached to the vehicle body. When the tongue plate 52 engages in the buckle 54, an occupant seated on his/her seat 50 puts on the webbing 51. In the state in which the occupant has put on the webbing, a portion of the webbing 51 from a shoulder anchor 55 thereof to the tongue plate 52 serves as a shoulder webbing 51A, whereas a portion thereof from the tongue plate 52 to the anchor plate serves as a lap webbing 51B. When the vehicle suddenly decelerates, the retractor 53 is activated so as to stop the withdrawal of the webbing 51. A certain type of retractor 53 detects an extended length of the webbing 51 so as to perform various operations such as the detection of the presence or absence of the fastening of the seat belt to the occupant, the switching of a lock mechanism, the release of a safety device for a pretensioner, etc. This extended webbing length is detected by, for example, reducing a rotational speed of a webbing retractor and transferring the reduced rotational speed to a driven gear and opening and closing an opening/closing contact by a part of the driven gear.

In the conventional reduction gear mechanism, however, the minimum number of teeth of the pinion was limited from the viewpoint of the strength of the teeth thereof to obtain a large reduction ratio under a size-reduced gear mechanism and a double-reduction gear was necessary.

SUMMARY OF THE INVENTION

With the foregoing in view, it is therefore an object of the present invention to provide a gear mechanism capable of enhancing a reduction ratio thereof and decreasing the number of parts so as to reduce the size thereof and to a webbing retractor equipped with the gear mechanism.

According to a first aspect of the present invention, for achieving the above object, there is provided a gear mechanism for reducing a rotational speed of a driving gear and transmitting the reduced rotational speed to a gear to be driven, comprising an arbitrary number of gear teeth attached to the driving gear, which is smaller than the number of teeth determined by a module, and a stopper having a stopper surface which is attached to the driving gear so as to be displaced relative to the gear teeth along the axial direction of the driving gear and which draws a circle identical in size to a circle drawn by a locus of rotation of an addendum of each ear tooth upon rotation of the driving gear, the stopper surface being maintained in meshing engagement with gear teeth of the driven gear upon disengagement of the gear teeth from the teeth of the driven gear so that the rotation of the driver gear is controlled by the stopper.

According to the first aspect of the present invention, since the number of teeth of the driving gear is smaller than the number of teeth determined by the normal module, the gear mechanism rotates the driven gear under a further reduced rotational speed as compared with the normal gear mechanism. Namely, the number of rotations of the driven gear per rotation of the driving gear is reduced. Further, the driving gear has the stopper with the stopper surface. When the driving gear is in disengagement with the driven gear, the stopper surface is maintained in meshing engagement with its corresponding gear teeth of the driven gear so as to prevent the driven gear from rotating. Thus, the mesh of the gear teeth of the driving gear with the gear teeth of the driven gear and the meshing engagement of the stopper surface with the gear teeth of the driven gear are alternately repeated under the rotation of the driving gear so that the driven gear is intermittently rotated, thereby making it possible to enhance a reduction ratio.

In one embodiment, the stopper may be a partly-cut and substantially disc-like portion. Further, the stopper surface may be an arcuate outer peripheral surface of the disc-like portion.

In the aforementioned embodiment, the gear teeth of the driven gear comprise a plurality of first gear teeth each having a thickness substantially the same as an axially-extending thickness of the driving gear and a plurality of second gear teeth each having a thickness substantially the same as the thickness of each gear tooth of the driving gear. The first gear teeth and the second gear teeth are respectively alternately attached to the driven gear.

When the gear tooth of the driving gear is disengaged from the second gear tooth of the driven gear, the stopper surface can be placed between the adjacent first gear teeth so as to control the rotation of the driven gear.

In the above embodiment, the arbitrary number of gear teeth are adjacent two gear teeth of the number of teeth determined by the module.

In another embodiment, the stopper is a substantially semidisc-like portion. The stopper surface is an arcuate outer peripheral surface of the substantially semidisc-like portion.

In another embodiment as well, the stopper has a form obtained by displacing two substantially semidisc-like portions having thicknesses substantially equal to each other in the axial direction of the driving gear and stacking the substantially semidisc-like portions on one another in step-like form so is to be formed into a substantially circle as seen in the plane. The stopper surface is arcuate outer peripheral surfaces of the two substantially semidisc-like portions.

In this embodiment, the gear teeth of the driving gear are respectively attached to the steplike portions. Tooth surfaces of the gear teeth of the driving gear are provided at end surfaces of the steplike portions.

In this embodiment as well, the driven gear includes teeth having thicknesses corresponding to the thicknesses of the substantially semidisc-like portions, which are alternately provided so as to correspond to positions of the two substantially semidisc-like portions, which extend in the axial direction of the driving gear.

Further, in this embodiment, the gear teeth of the driving gear are provided on both sides of the steplike portions, which extend in the axial direction of the driving gear.

In a further embodiment, the driving gear is a substantially cylindrical body. The gear tooth of the driving gear is provided at a portion of the substantially cylindrical body, for forming longitudinally-extending ends of spiral groove defined in an axially-extending intermediate portion of the substantially cylindrical body. The stopper surface is circular circumferential surfaces of the substantially cylindrical body, which are provided on both sides of the groove.

In this embodiment, each gear tooth of the driven gear is inclined to the axis of the driven gear so as to be storable within the spiral groove.

In this embodiment as well, the driving gear and the driven gear are provided so as to be movable in their axial directions.

According to a second aspect of the present invention, there is provided a webbing retractor for winding a webbing fastened to a vehicle occupant on a webbing take-up spindle provided therein, comprising a driving gear having an arbitrary number of first gear teeth smaller than the number of teeth determined by a module, the driving gear being rotated under the action of rotation of the webbing take-up spindle, a driven gear having a plurality of second gear teeth each maintained in meshing engagement with the first gear tooth of the driving gear, the driven gear being rotated under the action of rotation of the driving gear in a state in which the first gear tooth is in meshing engagement with the second gear tooth, a stopper provided integrally with the driving gear, the stopper being meshed with the second gear tooth so as to stop the rotation of the driven gear upon disengagement of the first gear tooth from the second gear tooth, and a switch device turned on and off in response to the rotation of the driven gear.

According to the second aspect, the present invention is one wherein a gear mechanism is applied to the vehicle webbing retractor. When a webbing attached to a seat belt system is pulled out and wound up, the webbing take-up spindle of the webbing retractor is rotated to turn the driving gear. Since the number of the teeth of the driving gear is smaller than the number of the teeth determined by the normal module, the driven gear is rotated under a further reduced rotational speed as compared with the normal gear mechanism. Namely, the number of rotations of the driven gear per rotation of the driving gear is reduced. Further, the driving gear has the stopper. When the first gear teeth are in disengagement with the second gear teeth, the stopper is maintained in meshing engagement with the second gear teeth so as to prevent the driven gear from rotating. Thus, the mesh of the first gear teeth with the second gear teeth and the engagement of the stopper with the second gear teeth are alternately repeated under the rotation of the driving gear so that the driven gear is intermittently rotated, thereby making it possible to enhance a reduction ratio. Namely, when the first gear tooth of the driving gear meshes with the second gear tooth of the driven gear, a stopper surface is disengaged from the second gear teeth to transfer the rotation of the driving gear to the driven gear, whereby the driven gear is driven. When the stopper of the driving gear is in meshing engagement with the second gear teeth of the driven gear, the driven gear is prevented from rotating so as to stop rotating. Thus, the reduction ratio can be enhanced by intermittently rotating the driven gear. Further, the present webbing retractor includes the switch device for generating an on/off signal according to the rotation of the driven gear. The on/off signal is sent to an angular displacement detector where an angular displacement of the driven gear is detected. A webbing wear detector can detect, based on the detected angle of rotation, whether the webbing has been fastened to the occupant, for example.

According to the present invention as described above, since the stopper surface is separated from between the teeth of the driven gear when the gear tooth of the driving gear meshes with the driven gear, the rotation of the driving gear is transferred to the driven gear so that the driven gear is driven. When the stopper surface of the driving gear meshes between the teeth of the driven gear, the driven gear is prevented from rotation so as to stop rotating. Therefore, the reduction ratio can be enhanced by intermittently rotating the driven gear.

Thus, according to the present invention, the reduction ratio of the gear mechanism can be enhanced and the number of parts can be reduced as compared with the conventional gear mechanism, thereby making it possible to reduce the gear mechanism in size.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DETAILED DESCRIPTION OF THE PREFERRED EMBODIMENTS

Preferred embodiments of the present invention will hereinafter be described with reference to the accompanying drawings.

[First Embodiment]

Figure 1:
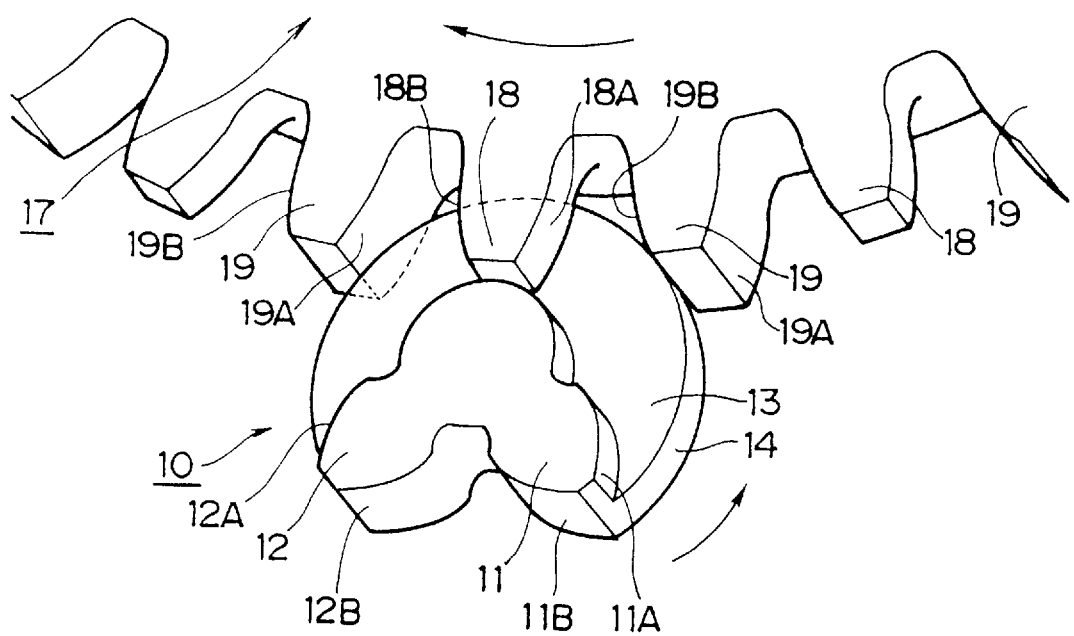
FIG. 1 is a perspective view showing a gear mechanism according to a first embodiment of the present invention.
Figure 2A:
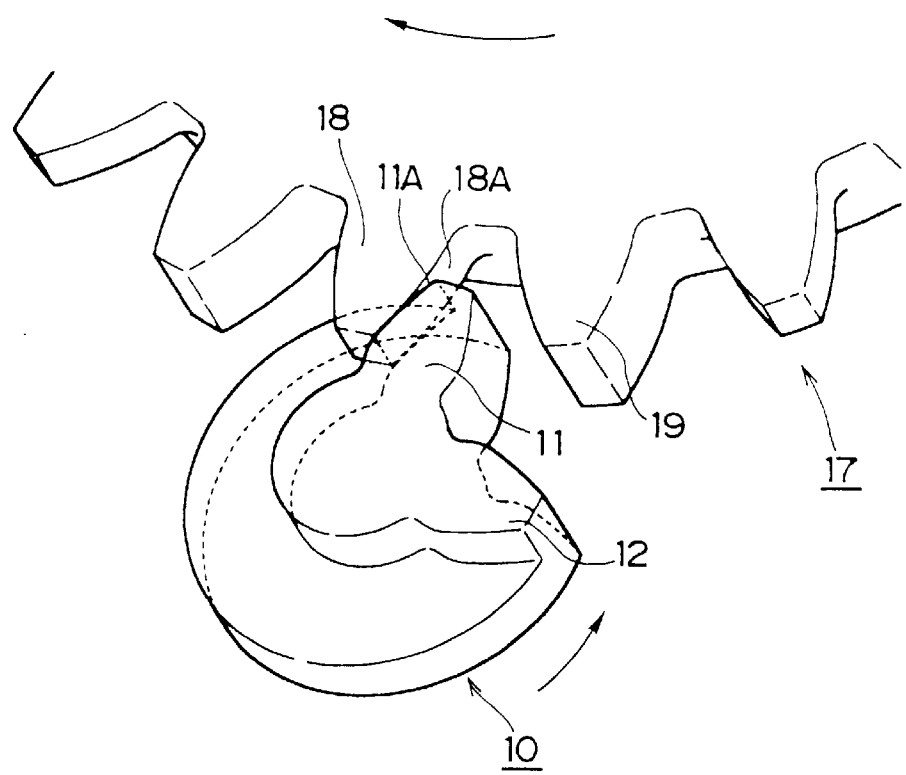
FIG. 2A is a perspective view illustrating a meshed state of the gear mechanism shown in FIG. 1.
Figure 2B:
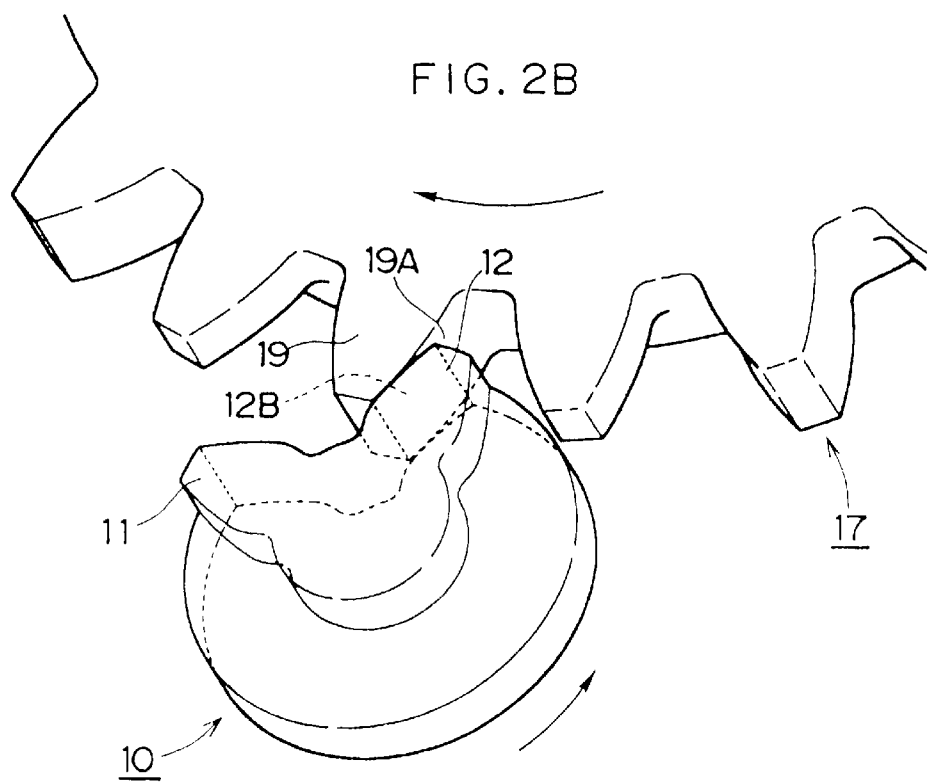
FIG. 2B is a perspective view depicting another meshed state of the gear mechanism shown in FIG. 1.

FIGS 1, 2A and 2B show a first; embodiment of the present invention. The present embodiment is one of a type wherein two teeth of a gear to be driven are contintuously rotated relative to one rotation of a pinion so that the driven gear is intermitted once (i.e., the driven gear is rotated once per rotation of the pinion and caused to cease once).

FIG. 1 is a perspective view showing a principal part of a gear mechanism. FIGS. 2A and 2B are respectively views showing meshed states of gears. FIG. 1 shows a state in which the rotation of a gear 17 to be driven is controlled by a stopper 13 of a pinion 10.

Assuming that the number of teeth determined by a module, i.e., an arbitrary number smaller than a value obtained by dividing the diameter of a pitch circle by the module, e.g., the number of teeth corresponding to the value obtained by dividing the diameter of the pitch circle by the module is regarded as five, the number of gear teeth of the pinion 10 that is a driving gear, is set to two teeth smaller than five teeth. For example, three teeth are removed from the five teeth and the remaining adjacent two teeth are formed as continuous gear teeth 11 and 12.

The pinion 10 has the stopper 13 coaxially and integrally with the gear teeth 11 and 12. The gear teeth 11 and 12 respectively include tooth surfaces 11A and 12A having widths equal to half the thicknesses of the gear teeth 11 and 12 and tooth surfaces 11B and 12B having widths the same as those of the gear teeth 11 and 12. Tooth surfaces 11A, 11B and 12A, 12B terminate, at their root portions, in undercut portion 11C, 11D and 12C, 12D. The stopper 13 is shaped in the form of a partly-cut disc and includes a stopper surface 14 which draws a circular arc or circle identical to that drawn by the locus of rotation of a tip or addendum of each of the gear teeth 11 and 12. Namely, the stopper 14 is formed on the back sides (i.e., the reverse side of FIG. 1) of the gear teeth 11 and 12 so as to be displaced in the form of steplike offsets relative to the tooth surfaces 11A and 12A, i.e., in the axial direction of the pinion 10. Further, when the stopper surface 14 is interposed between gear teeth 19 and 19 of the driven gear 17 to be described later, the stopper 13 serves so as to prevent the driven gear 17 from rotating.

A plurality of teeth 18 each having two tooth surfaces identical to the tooth surfaces 11A and 12A of the gear teeth 11 and 12 of the pinion 10 and a plurality of teeth 19 each having two tooth surfaces identical to tooth widths of the tooth surfaces 11B and 12B are alternately attached to the driven gear 17. Namely, the teeth 18 of the driven gear 17 are disposed on the upper side (this side of FIG. 1) and maintained in meshing engagement with the tooth surfaces 11A and 12A of the gear teeth 11 and 12 of the pinion 10. Further, the stopper surface 14 enters into the back side of tooth surfaces of each tooth 18 of the driven gear 17. When the stopper surface 14 of the pinion 10 is maintained in meshing engagement with or corresponds to the teeth 19 and 19 of the driven gear 17, the back of the tooth 18 of the driven gear 17 is opposed to the surface (i.e., the surface on this side of FIG. 1) of the stopper 13. Although not shown in the drawing, the pinion 10 and the driven gear 17 are supported by their corresponding support shafts. The pinion 10 is rotated by an unillustrated drive source.

The operation of the present invention will now be described. The pinion 10 is rotated in a counterclockwise direction from the state shown in FIG. 1 if necessary, so that the stopper 13 is withdrawn from between the teeth 19 and 19 of the driven gear 17. Further, the tooth surface 11A of the gear tooth 11 is maintained in meshing engagement with its corresponding tooth surface 18A of one tooth 18 of the driven gear 17 as shown in FIG. 2A so that the tooth 18 of the driven gear 17 is rotated in a clockwise direction. Namely, the driven gear 17 is rotated by one tooth. Further, when the pinion 10 is rotated, the tooth surface 12B of the gear tooth 12 is maintained in meshing engagement with its corresponding tooth surface 19A of one tooth 19 of the driven gear 17 as shown in FIG. 2B so that the driven gear 17 is further rotated by one tooth. When the gear teeth 11 and 12 are released from meshing with the driven gear 17, the stopper surface 14 of the stopper 13 meshes with the tooth surfaces 19A and 19B of the teeth 19 and 19 of the driven gear 17 so as to control the rotation of the driven gear 17 as shown in FIG. 1. Namely, when the stopper 13 is in meshing engagement with the driven gear 17, the driven gear 17 cannot be freely rotated.

In the first embodiment, since the driven gear 17 is rotated by two teeth so as to perform one intermittent operation when the pinion 10 is rotated once, a reduction ratio can be enhanced. Further, since the gear teeth 11 and 12 are formed integrally with the stopper 13 in consideration of the strength of the gear teeth 11 and 12 of the pinion 10, no problem occurs in the strength of the gear teeth 11 and 12 even if the number of teeth is smaller than the value obtained by dividing the diameter of the pitch circle of the pinion 10 by the module.

Thus, in the first embodiment, the reduction ratio of the gear mechanism can be enhanced and the number of parts can be reduced as compared with the conventional gear mechanism, thereby making it possible to reduce the gear mechanism in size.

As an alternative embodiment although not shown in the drawing, may be mentioned a gear mechanism wherein the number of gear teeth of the pinion 10 is set to three teeth provided continuously and the tooth 18 of the driven gear 17 is continuously provided two, followed by provision of one tooth 19, i.e., when two teeth 18 and one tooth 19 are repeatedly arranged, the driven gear 17 is rotated by three teeth with respect to one rotation of the pinion to so that one intermittent operation is performed.

[Second Embodiment]

Figure 3:
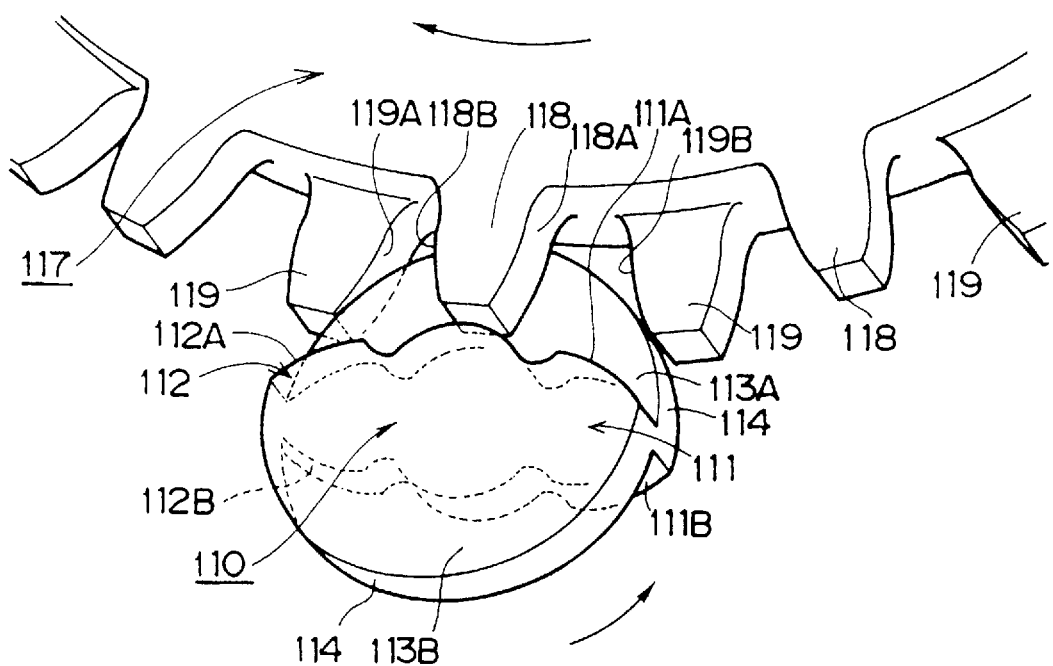
FIG. 3 is a perspective view showing a gear mechanism according to a second embodiment of the present invention.
Figure 4A:
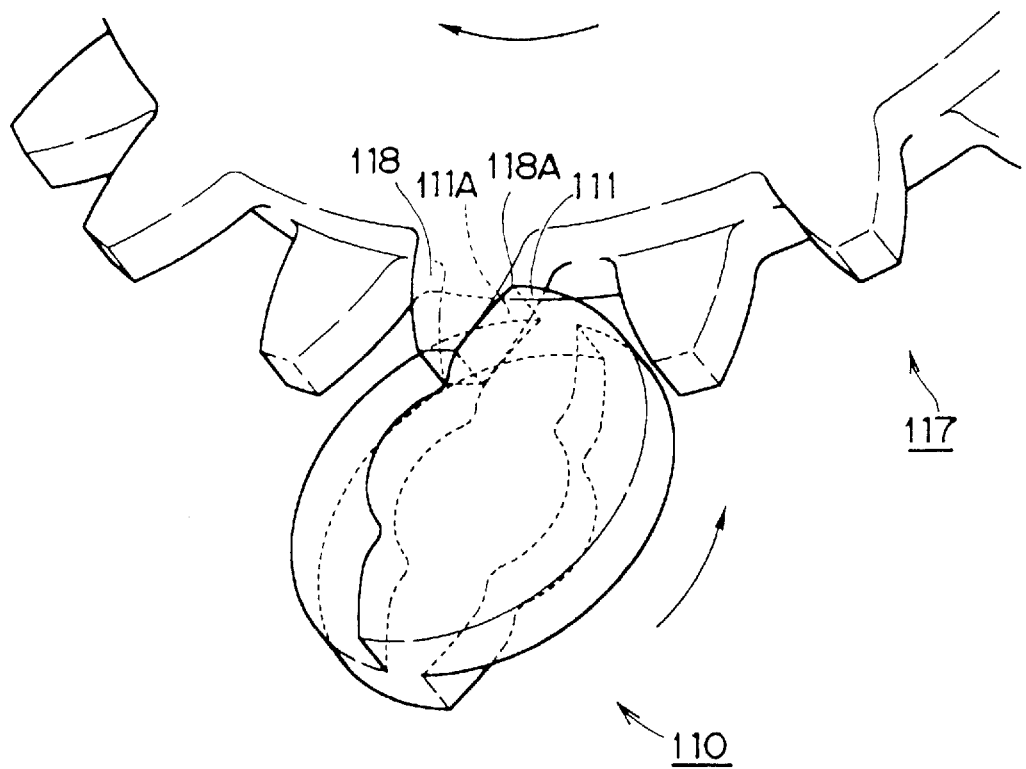
FIG. 4A is a perspective view illustrating a meshed state of the gear mechanism shown in FIG. 3.
Figure 4B:
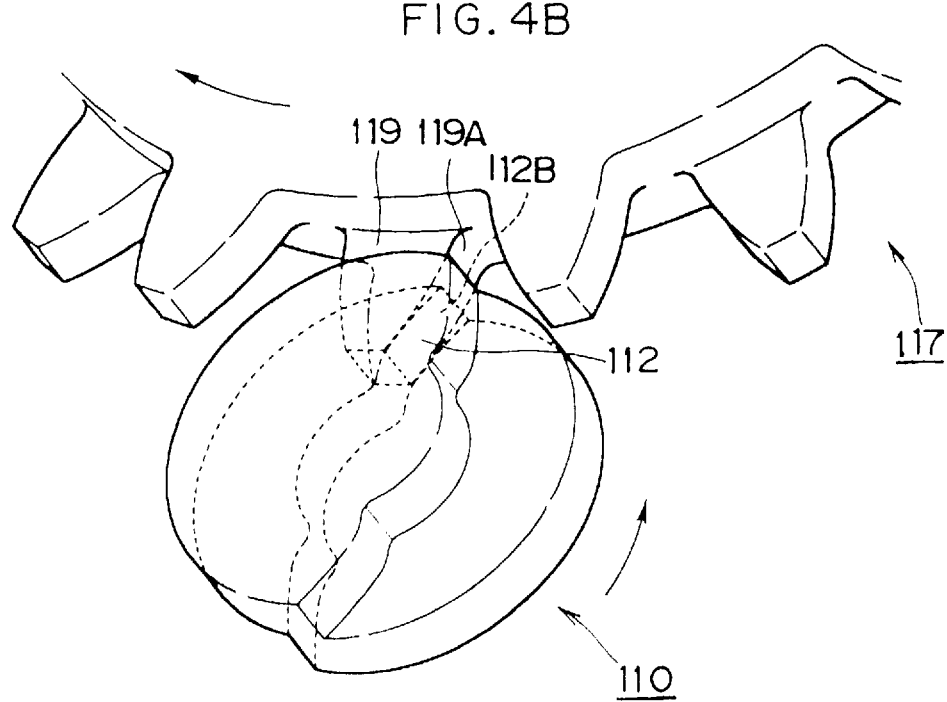
FIG. 4B is a perspective view depicting a meshed state of the gear mechanism shown in FIG. 3.

FIG. 3 and FIGS. 4A and 4B show a second embodiment of the present invention. The present embodiment is one of a type wherein a gear to be driven is intermittently rotated by two teeth with respect to one rotation of a pinion and is intermitted twice (i.e., the driven gear is rotated twice per rotation of the pinion and caused to cease twice).

FIG. 3 is a perspective view showing an essential part of a gear mechanism. FIGS. 4A and 4B are respectively views showing meshed states of gears. FIG. 3 illustrates a state in which the rotation of a gear 117 to be driven is controlled by a stopper 113A of a pinion 110.

The pinion 110, which serves as a driving gear, comprises two connected substantially semidisc-like portions shaped stepwise along the axial direction of the pinion 110 so as to form a disc as seen in the plane. These substantially semidisc-like portions are respectively defined as stoppers 113A and 113B. Two gear teeth 111 and 112 are provided on both sides of the steplike portion with the axis of the pinion 110 interposed therebetween. Further, tooth surfaces 11A and 112A of the stopper 113B for these gear teeth 111 and 112 respectively have thicknesses corresponding to half the thicknesses or the gear teeth 111 and 112, whereas teeth surfaces 111B and 112B of the stopper 113A also have thicknesses corresponding to half the thicknesses of the gear teeth 111 and 112 respectively. Tooth surfaces 111A, 111B and 112A and 112B terminate, at their root portions, in undercut portions 111C, 111D and 112C, and 112D.

The stopper 113B is disposed on the front side of the gear teeth 111 and 112 as seen in FIG. 3 and the stopper 113A is disposed on the far side thereof. They are formed integrally with their corresponding gear teeth 111 and 112 in the form of a steplike offset along the axial direction of the pinion 110. Namely, the stopper 113A is disposed on the lower sides of the tooth surfaces 111A and 112A of the gear teeth 111 and 112, whereas the stopper 113B is disposed on the upper sides of the tooth surfaces 111B and 112B. Further, the stoppers 113A and 114A respectively have substantially-semicircular stopper surfaces 114 each of which has a radius the same as that of a circle drawn by the locus of rotation of a tip or addendum of each of the gear teeth 111 and 112, i.e., each of which draws a circle the same as the circle drawn by the locus.

Teeth 118 and 119 of the driven gear 117 are alternately formed it intervals in the axial direction of the driven gear 117 so as to correspond to steplike offsets of the gear teeth 111 and 112 respectively. The tooth surface 111A of the gear tooth 111 of the pinion 110 is provided so as to be maintained in meshing engagement with its corresponding tooth surface 118A of each tooth 118 of the driven gear 117 (see FIG. 4A) and the tooth surface 112B of the gear tooth 112 is provided so as to be maintained in meshing engagement with its corresponding tooth surface 119A of each tooth 119 of the driven gear 117 (see FIG. 4B), whereby a rotational force of the pinion 110 is transferred to the driven gear 117. Further, a stopper surface 114 of the stopper 113A is provided so as to mesh between the tooth surfaces 119A and 119B of two teeth 119 (see FIG. 1). The stopper surface 114 of the stopper 114A is provided so as to mesh between the tooth surfaces 118A and 118B of two teeth 118.

Although not shown in the drawing, the pinion 110 and the driven gear 117 are supported by their corresponding support shafts.

According to the aforementioned construction, the pinion 110 is rotated in a counterclockwise direction when necessary so that the tooth surface 111A of the gear tooth 111 is maintained in meshing engagement with its corresponding tooth surface 118A of one tooth 118 of the driven gear 117 as shown in FIG. 4A, thereby rotating the tooth 118 of the driven gear 117 in a clockwise direction. Namely, the driven gear 117 is rotated by one tooth. When the pinion 110 is further rotated, the stopper surface 114 of the stopper 113B meshes with the tooth surfaces 118A and 118B of the driven gear 117 thereby to stop the rotation of the driven gear 117. When the pinion 110 is subsequently rotated, the tooth surface 112B of the gear tooth 112 is maintained in meshing engagement with its corresponding tooth surface 119A of one tooth 119 of the driven gear 117 so as to rotate the tooth 119 of the driven gear 117 in the clockwise direction as shown in FIG. 4B. Namely, the driven gear 117 is rotated by one tooth.

When the gear teeth 111 and 112 are released from meshing engagement with the driven gear 117, the stopper surface 114 of the stopper 113A is maintained in meshing engagement with the tooth surfaces 119A and 119B of the tooth 119 of the driven gear 117 so as to stop the rotation of the driven gear 117 as shown in FIG. 3. Namely, when the stoppers 113A and 113B are in meshing engagement with the driven gear 117, the driven gear 117 cannot be freely rotated.

According to the second embodiment, since the driven gear 117 is rotated by two teeth so as to perform intermittent operations twice when the pinion 110 is rotated once, a reduction ratio can be enhanced. Further, since the gear teeth 111 and 112 are formed integrally with the stoppers 113A and 113B in consideration of the strength of the gear teeth 111 and 112 of the pinion 110, the strength of the gear teeth 111 and 112 presents no problem even if the number of teeth is smaller than the value obtained by dividing the diameter of the pitch circle of the pinion 110 by the module.

Thus, in the second embodiment, the reduction ratio of the gear mechanism can be enhanced and the number of parts can be reduced as compared with the conventional gear mechanism, thereby making it possible to reduce the gear mechanism in size.

[Third Embodiment]

FIGS. 5, 6, 7A and 7B show a third embodiment of the present invention. The present embodiment is one of a type wherein a gear to be driven is rotated by one tooth and intermittent once as a pinion is rotated once.

Figure 5:
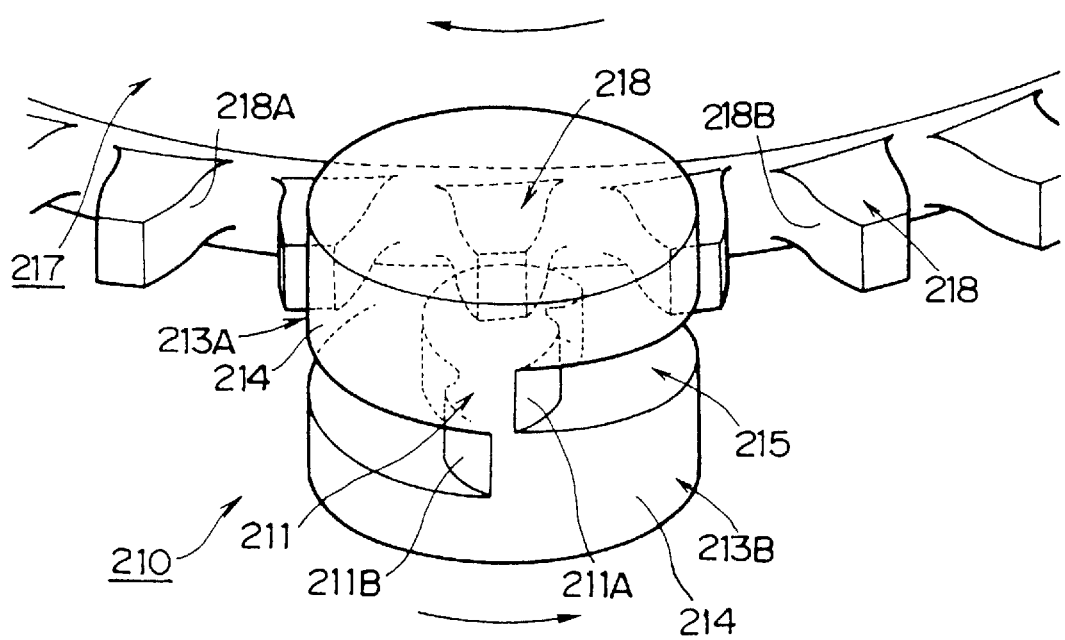
FIG. 5 is a perspective view showing a gear mechanism according to a third embodiment of the present invention.
Figure 6:
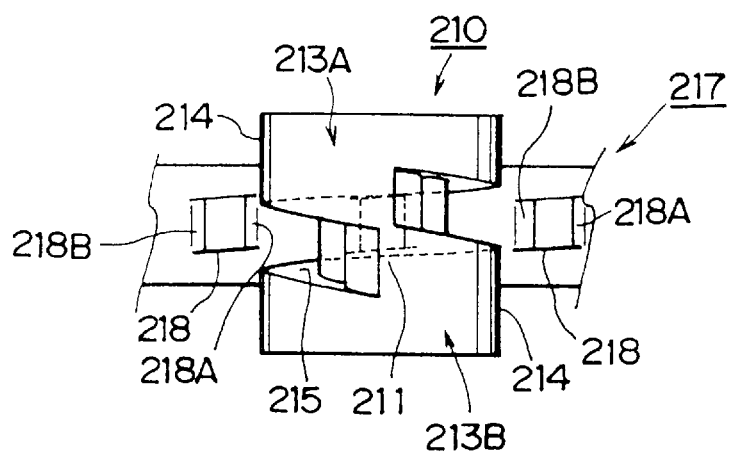
FIG. 6 is a side view illustrating the gear mechanism shown in FIG. 5.
Figure 7A:
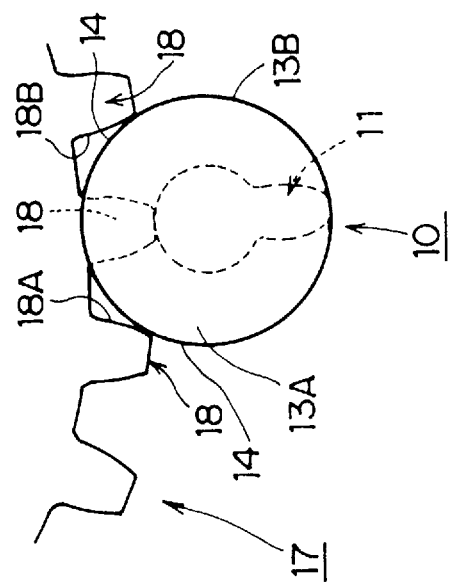
FIG. 7A is a plan view depicting an engaged state of the gear mechanism shown in FIG. 5.
Figure 7B:
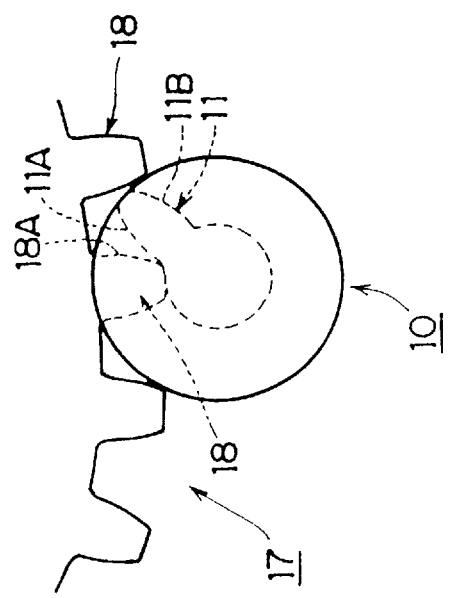
FIG. 7B is a plan view showing another engaged state of the gear mechanism shown in FIG. 5.

FIG. 5 is a fragmentary perspective view of a gear mechanism. FIG. 6 is a side view illustrating the gear mechanism. FIGS. 7A and 7B are respectively views showing meshed states of gears. FIG. 5 illustrate a state in which the rotation of a driven gear 217 has been controlled by stoppers 213A and 213B of a pinion 210.

The pinion 210, which serves as a driving gear, comprises a gear tooth 211 and stoppers 213A and 213B both of which are integrally formed. A gear tooth 211 is formed so that both ends of the spiral groove 215 serve as tooth surfaces 211A and 211B. Tooth surfaces 211A, 211B terminate, at their root portions, in undercut portions 211C, 211D. The stoppers 213A and 213B respectively have stopper surfaces 214 and 214 each of which draws a circle identical to that drawn by the locus or rotation of a tip or addendum of the gear tooth 211, i.e., a circle having a radius the same as that of the circle drawn by the locus. Namely, outer peripheral surfaces on both sides of the groove 215 of the pinion 210 are defined as the stopper surfaces 214 and 214. As shown in FIG. 6, the stoppers 213A and 213B are disposed so as to be able to mesh with a tooth surface 218A or 218B of one tooth 218 of the driven gear 217 according to the direction of rotation of the pinion 210.

As shown in FIGS. 5 and 6, the teeth 218 of the driven gear 217 are respectively formed diagonally to both side faces of the driven gear 217 in consideration of the meshing engagement with the gear tooth 211 of the pinion 210. In the gear mechanism, each tooth 218 of the driven gear 217 is placed in a state of being inserted into its corresponding groove 215 of the pinion 210.

Although not shown in the drawing, the pinion 210 and the driven gear 217 are supported by their corresponding support shafts. Further, the pinion 210 and the driven gear 217 are constructed so as to be freely movable in their axial directions.

According to the aforementioned construction, the pinion 210 is rotated in a counterclockwise direction when necessary so that the tooth surface 211A of the gear tooth 211 is maintained in meshing engagement with its corresponding tooth surface 218A of one tooth 218 of the driven gear 217 as shown in FIG. 7B, thereby rotating the tooth 218 of the driven gear 217 in a clockwise direction. Namely, the driven gear 217 is rotated by one tooth. When the gear tooth 211 is released from engagement with its corresponding tooth 218 of the driven gear 217, the stopper surfaces 214 and 214 of the stoppers 213A and 213B are maintained in meshing engagement with their corresponding tooth surfaces 218A and 218B of the teeth 218 of the driven gear 217 so as to control the rotation of the driven gear 217 as shown in FIGS. 6 and 7A. Namely, when the stoppers 213A and 213B are in meshing engagement with the driven gear 217, the driven gear 217 cannot be freely rotated.

According to the third embodiment, since the driven gear 217 is rotated by one tooth so as to perform an intermittent operation once when the pinion 210 is rotated once, a reduction ratio can be enhanced. Further, since the gear tooth 211 is formed integrally with the stoppers 213A and 213B in consideration of the strength of the gear tooth 211 of the pinion 210, the strength of the gear tooth 211 presents no problem even if the number of teeth is smaller than a value obtained by dividing the diameter of a pitch circle of the pinion 210 by a module.

Thus, in the third embodiment, the reduction ratio or the gear mechanism can be enhanced and the number of parts can be reduced as compared with the conventional gear mechanism, thereby making it possible to reduce the gear mechanism in size.

[Fourth Embodiment]

Figure 8:
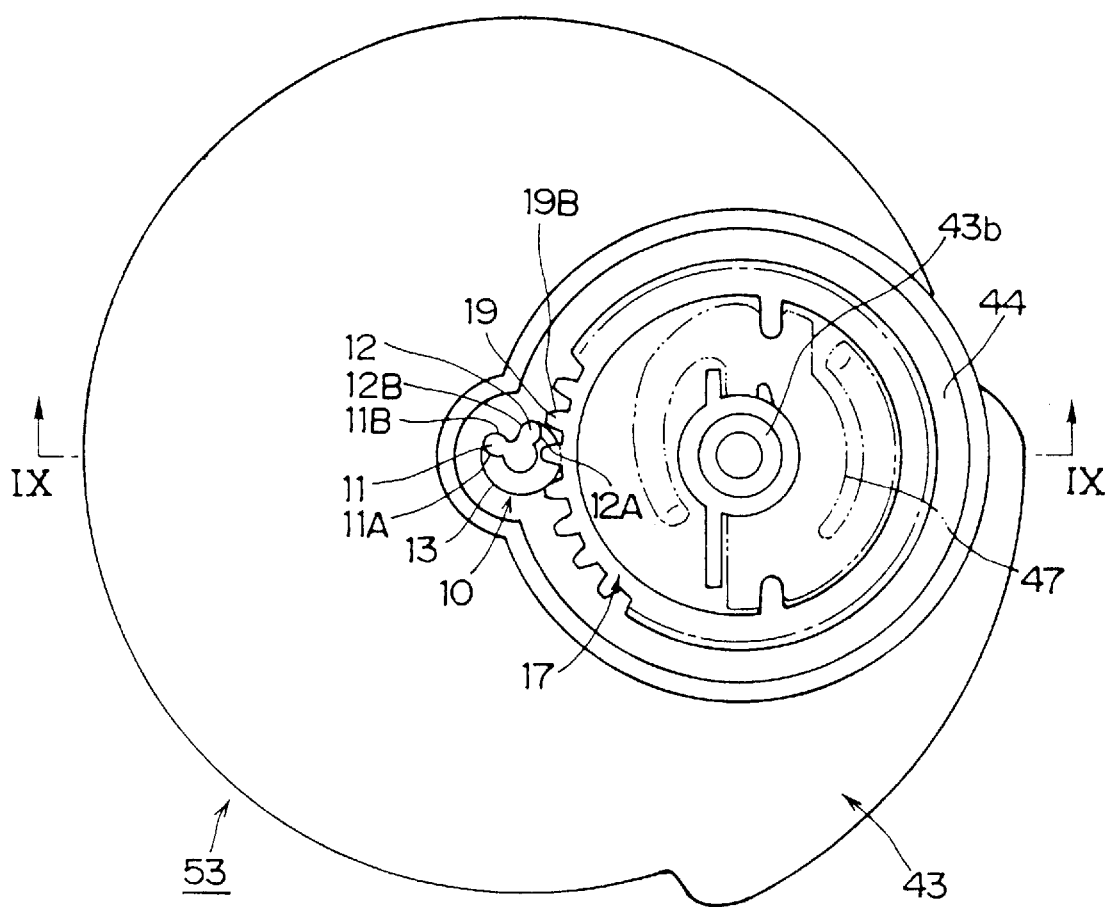
FIG. 8 is a front view illustrating a gear mechanism applied to a retractor according to a fourth embodiment of the present invention.
Figure 9:
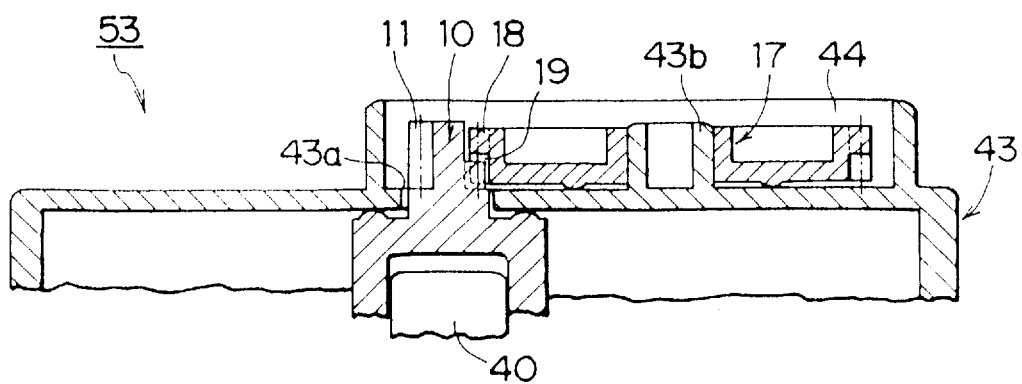
FIG. 9 is a cross-sectional view taken along line IX—IX of FIG. 8.
Figure 10:
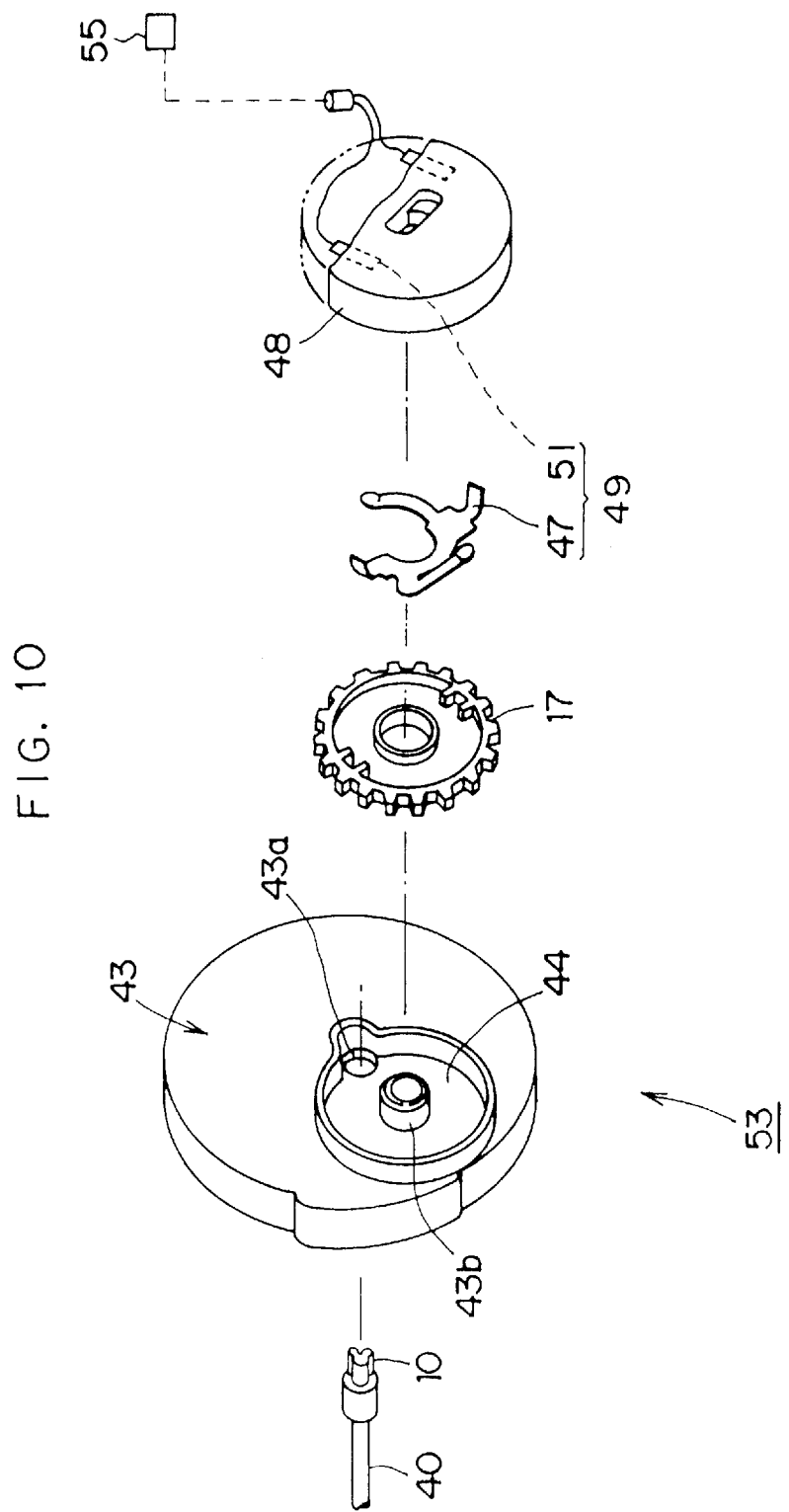
FIG. 10 is an exploded perspective view depicting the retractor shown in FIG. 8.

FIGS. 8 through 10 illustrate a fourth embodiment of the present invention. The present embodiment is one of a type wherein the gear mechanism according to the first embodiment is applied to a retractor 53 which is a webbing retractor. Further, the webbing retractor includes a switch mechanism or device in relation to the gear mechanism. Accordingly, the construction and operation of the gear mechanism will be described with reference to FIGS. 1 and 2.

FIG. 8 is a front view showing the retractor according to the present embodiment. FIG. 9 is a cross-sectional view taken along line IX—IX of FIG. 8. FIG. 10 is an exploded perspective view showing an essential part of the retractor.

As shown in FIGS. 9 and 10, a pinion 10, which serves as a driving gear, is fixed to a leading end of a webbing take-up spindle 40 and rotated integrally with the webbing take-up spindle 40. Further, two continuous gear teeth 11 and 12 and a stopper 13 are integrally formed so as to constitute the pinion 10 as shown in FIG. 1. The gear teeth 11 and 12 respectively have tooth surfaces 11A and 12A in which the thicknesses of the teeth are reduced and tooth surfaces 11B and 12B in which the thicknesses of the teeth are increased. The stopper 13 has a stopper surface 14 which draws a circle identical to that drawn by the locus of rotation of an addendum of each of the gear teeth 11 and 12. Namely, the stopper surface 14 is shaped on the back sides of the gear teeth 11 and 12 in the form of a steplike offset. The stopper 13 controls the rotation of the driven gear 17 with the stopper surface 14 interposed between gear teeth 19 and 19 of the driven gear 17 to be described later.

A storage portion 44 is formed in a cover 43. Further, a hole 43a for allowing the pinion 10 to project into the storage portion 44 and a shaft 43b are formed in the storage portion 44. As shown in FIGS. 8 through 10, the driven gear 17 is supported by the shaft 43b.

Teeth 18 each having two tooth surfaces equal to the tooth surfaces 11A and 12A of the gear teeth 11 and 12 of the pinion 10 and teeth 19 each having two tooth surfaces equivalent to thicknesses of the teeth 11 and 12 having the tooth surfaces 11B and 12B are alternately attached to the driven gear 17. Namely, the teeth 18 of the driven gear 17 are disposed on the upper side of the driven gear 17 and maintained in meshing engagement with the tooth surfaces 11A and 12A of the gear teeth 11 and 12 of the pinion 10. Further, the stopper surface 14 meshes with the lower side of the tooth surface of each tooth 19 of the driven gear 17. When the stopper 13 of the pinion 10 is in engagement with the teeth 19 and 19 of the driven gear 17, one surface of the tooth 18 of the driven gear 17 is opposed to one surface of the stopper 13.

A switch device 49 comprises a first contact member 47 fixed to the driven gear 17 and a second contact member 51 (not shown) fixed to a switch cover 48. When the gear 17 is rotated through a predetermined angle in a predetermined direction, the first contact member 47 is brought into contact with the second contact member 51 so that the switch device 49 is turned on. On the other hand, when the gear 17 is rotated in the direction opposed to the predetermined direction, the first contact member 47 is separated from the second contact member 51 so that the switch device 49 is turned off. Thus, the webbing take-up spindle 40 is rotated so as to turn the driven gear 17 through a predetermined angle in a predetermined direction, the first contact member 47 is brought into contact with the second contact member 51 provided within the switch cover 48. Owing to the contact referred to above, an on signal is generated from the switch device 49 so as to be sent to a turning angle detector 55 where and angular displacement of the driven gear 17 is detected. Incidentally, the switch cover 48 is fixed to the cover 43 so as to cover the storage portion 44 of the cover 43, i.e., the gear mechanism.

Figure 11:
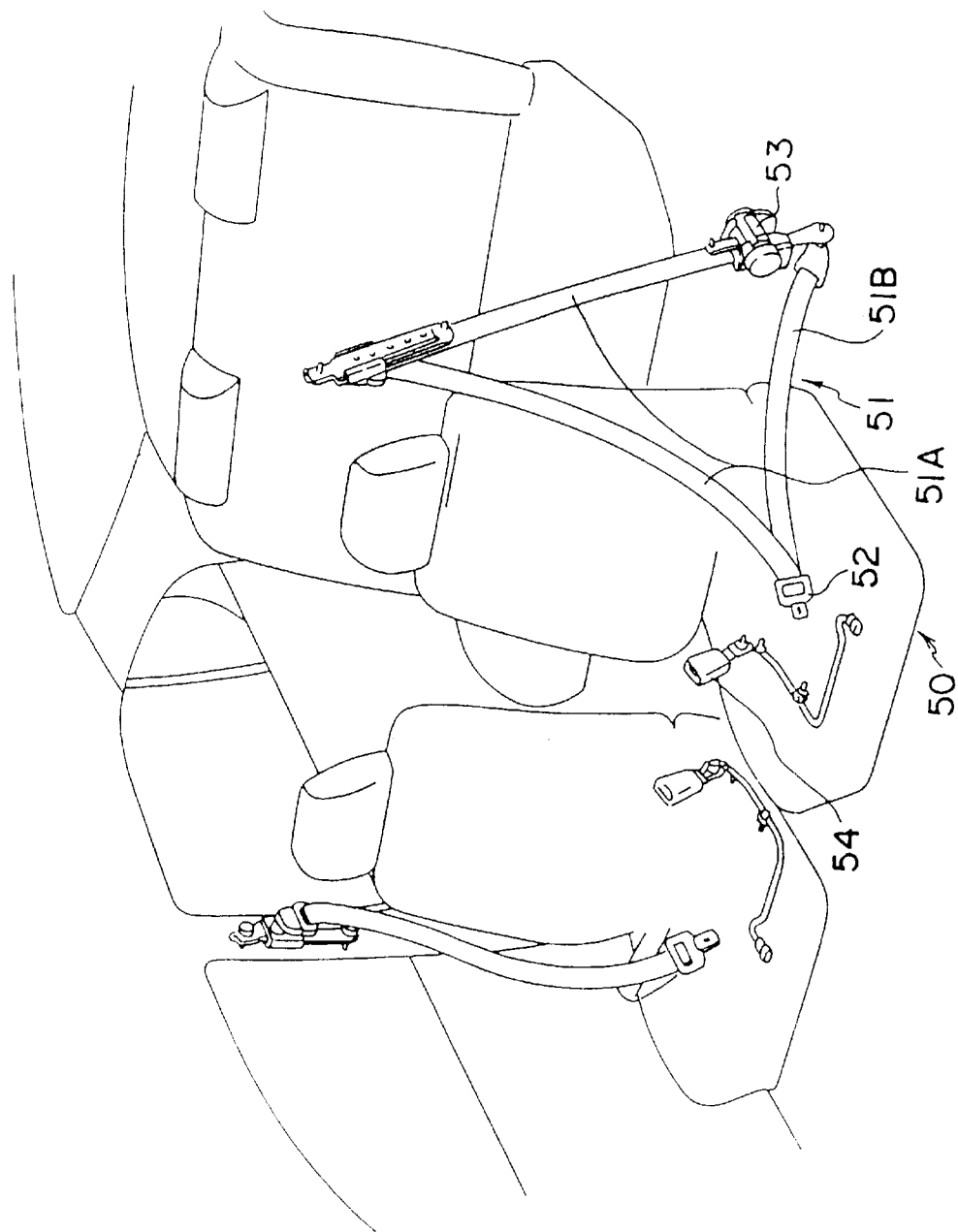
FIG. 11 is a schematic perspective view showing a vehicle seat belt system.

In the above-described construction, when a shoulder webbing 51A (see FIG. 11) is taken up or pull out according to the fastening of the webbing to a vehicle occupant, the release of the occupant from its fastening or a change in occupant's position at the time that the webbing has been fastened to the occupant, the webbing take-up spindle 40 is rotated. When the shoulder webbing 51A is wound on the webbing take-up spindle 40, for example, the webbing take-up spindle 40 is rotated in the counterclockwise direction. In doing so, the tooth surface 11A of the gear tooth 11 is maintained in meshing engagement with its corresponding tooth surface 18A of the tooth 18 of the driven gear 17 as shown in FIG. 2A so that the corresponding tooth 18 of the driven gear 17 is rotated in the clockwise direction. Namely, the driven gear 17 is rotated by one tooth. Further, when the pinion 10 is rotated, the tooth surface 12B of the gear tooth 12 is maintained in meshing engagement with its corresponding tooth surface 19A of the tooth 19 of the driven gear 17 as shown in FIG. 2B so that the driven gear 17 is further rotated by one tooth. When the gear teeth 11 and 12 are released from meshing engagement with the driven gear 17, the stopper surface 14 of title stopper 13 is maintained in meshing engagement with the tooth surfaces 19A and 19B of the teeth 19 and 19 of the driven gear 17 to control the rotation of the driven gear 17 as shown in FIG. 1. Namely, when the stopper 13 is in engagement with the driven gear 17, the driven gear 17 cannot be freely rotated.

When the pinion 10 is rotated, the contact 47 is rotated integrally with the driven gear 17 and brought into contact with the unillustrated contact of the switch cover 48. As a result, the length of extension of the shoulder webbing 51A from the retractor 53 is detected to activate a seat belt wear warning device, a lock-means switching device or the like.

In the present embodiment, since the driven gear 17 is rotated by two teeth so as to perform one intermittent operation when the pinion 10 is rotated once, a reduction ratio can be enhanced. Further, since the gear teeth 11 and 12 are formed integrally with the stopper 13 in consideration of the strength of the gear teeth 11 and 12 of the pinion 10, no problem occurs in the strength of the gear teeth 11 and 12 even if the number of teeth is smaller than a value obtained by dividing the diameter of a pitch circle of the pinion 10 by a module.

Thus, the present embodiment can be applied to a webbing device or retractor capable of enhancing a reduction ratio of a gear mechanism. Further, since the present embodiment may use a single-reduction gear alone as compared with the conventional example in which a double-reduction gear is used to enhance the reduction ratio, the number of parts can be reduced and hence the webbing device equipped with the gear mechanism can be reduced in size.

The number of teeth of the driving gear (pinion) is not necessarily limited to those employed in the first through third embodiments. If the number of teeth is the number of teeth smaller than the number of teeth determined by the module of the driving gear, then the corresponding number of teeth can be applied in the same manner as described above. Even if a gear mechanism applied to a retractor such as a webbing retractor is used as, for example, a Geneva gear or the like of a type wherein when an engagement portion of a pinion engages a driven gear under the continuous rotation of the pinion, the driven gear is rotated and the engagement portion restrains a deactivated state of the driven gear in a state of being in disengagement with the driven gear, whereby the driven gear is intermittently rotated, the present invention can be applied to the webbing retractor.

Having now fully described the invention, it will be apparent to those skilled in the art that many changes and modifications can be made without departing from the spirit or scope of the invention as set forth herein.

What is claimed is:

1. A webbing retractor for winding a webbing fastened to a vehicle occupant on a webbing take-up spindle provided therein, comprising:

a driving gear having an arbitrary number of first gear teeth smaller than the number of teeth determined by a module, each of said first gear teeth having a root portion that includes undercut portions for enhancing a reduction ratio between said driving gear and a driven gear and for reducing a diameter of said driving gear, said driving gear being operably connected to and rotated by said webbing take-up spindle;

a driven gear having a plurality of second gear teeth for meshing engagement with a first gear tooth of said driving gear such that said driven gear is rotated by rotation of said driving gear when said first gear tooth is in meshing engagement with a second gear tooth of said driven gear;

a stopper provided integrally with said driving gear for engaging said second gear tooth to stop the rotation of said driven gear upon disengagement of said first gear tooth from said second gear tooth; and a switch device turned on and off in response to the rotation of said driven gear.

2. A webbing retractor according to claim 1, wherein said switch device includes a first contact rotated together with said driven gear and a second contact attached to a cover for covering said driven gear.

3. A webbing retractor according to claim 1, wherein said stopper has a stopper surface for engaging said first gear teeth along the axial direction of said driving gear and has a circular profile identical in size to a circle drawn by the locus of rotation of an addendum of said each first gear tooth upon rotation of said driving gear, said stopper preventing said driven gear from rotation by engaging said stopper surface onto said second gear teeth of said driven gear upon disengagement of said first gear teeth of said driving gear from said second gear teeth of said driven gear.

4. A webbing retractor according to claim 3, wherein said stopper is a partly-cut and substantially disc-like portion.

5. A webbing retractor according to claim 4, wherein said stopper surface is an arcuate outer peripheral surface of said substantially disc-like portion.

6. A webbing retractor according to claim 5, wherein said second gear teeth includes a plurality of third gear teeth each having a thickness substantially the same as a thickness of said driving gear and a plurality of fourth gear teeth each having a thickness substantially the same as a thickness of said each gear tooth of said driving gear, said third gear teeth and said fourth gear teeth being respectively alternately attached to said driven gear.

7. A webbing retractor according to claim 3, wherein said stopper is a substantially semidisc-like portion and said stopper surface is an arcuate outer peripheral surface of said substantially semidisc-like portion.

8. A webbing retractor for winding a webbing fastened to a vehicle occupant on a webbing take-up spindle provided therein, comprising:

a driving gear having an arbitrary number of first gear teeth smaller than the number of teeth determined by a module, each of said first gear teeth having a root portion that includes opposing undercut portions for enhancing a reduction ratio between said driving gear and a driven gear and for reducing a diameter of said driving gear, said driving gear being rotated under the action of rotation of said webbing take-up spindle;

a driven gear having a plurality of second gear teeth being rotated under the action of rotation of said driving gear in a state in which a first gear tooth is in meshing engagement with a second gear tooth; and a stopper provided integrally with said driving gear, said stopper being meshed with said second gear tooth of said driven gear so as to stop the rotation of said driven gear upon disengagement of said first gear tooth of said driving gear from said second gear tooth of said driven gear.

9. A webbing retractor for winding a webbing fastened to a vehicle occupant on a webbing take-up spindle provided therein, comprising:

a driving gear having a plurality of first gear teeth and being rotated under the action of rotation of said webbing take-up spindle, each of said first gear teeth having a root portion that includes opposing undercut portions for enhancing a reduction ratio between said driving gear and a driven gear and for reducing a diameter of said driving gear, a driven gear having a plurality of second gear teeth each maintained in meshing engagement with a first gear tooth of said driving gear, said driven gear being rotated intermittently by said driving gear when said first gear tooth of said driving gear is in meshing engagement with a second gear tooth of said driven gear; and a stopper provided integrally with said driving gear and having a surface for engaging said second gear tooth of said driven gear to stop the rotation of said driven gear upon disengagement of said first gear tooth of said driving gear from said second gear tooth of said driven gear.

10. A webbing retractor for winding a webbing fastened to a vehicle occupant on a webbing take-up spindle provided therein, comprising:

a driving gear having an arbitrary number of first gear teeth smaller than the number of teeth determined by a module, said driving gear being rotated around an axis by rotation of said webbing take-up spindle, and each of said first gear teeth having opposing sides orthogonal to said axis of rotation each of said first gear teeth having a root portion that includes opposing undercut portions for enhancing a reduction ratio between said driving gear and a driven gear and for reducing a diameter of said driving gear;

a driven gear having a plurality of second gear teeth being in meshing engagement with said first gear teeth of said driving gear and being rotated by said driving gear; and a stopper provided with said driving gear, and being integrally connected to one of said opposing sides of each of said first gear teeth of said driving gear to increase the strength of said first gear teeth for allowing the number of teeth of said driving gear to be made smaller to increase a reduction ratio between said driving gear and said driven gear, said stopper being meshed with said second gear teeth of said driven gear to stop the rotation of said driven gear upon disengagement of said first gear teeth from said second gear teeth.

11. A webbing retractor according to claim 10, wherein said opposing sides of said first gear teeth are flat, and said stopper is integrally connected to one of said opposing sides of each of said first gear teeth over the entire area of said one of said opposing sides.

12. A webbing retractor according to claim 11, wherein each of said first gear teeth has a root portion that includes opposing undercut portions.

* * * * *